US008254342B2

(12) United States Patent  (10) Patent No.: US 8,254,342 B2
Jeong et al.  (45) Date of Patent: Aug. 28, 2012

(54) METHOD FOR DETERMINING SUPERFRAME FOR BEACON SCHEDULING

(75) Inventors: Hoon Jeong, Daejon (KR); Jong-Oh Lee, Daejon (KR); Jong-Young Lee, Daejon (KR); Sun-Joong Kim, Daejon (KR); Cheol-Sig Pyo, Daejon (KR); Jong-Suk Chae, Daejon (KR)

(73) Assignee: Electronics and Telecommunications Research Institut, Daejon (KR)

( * ) Notice: Subject to any disclaimer, the term of this patent is extended or adjusted under 35 U.S.C. 154(b) by 625 days.

(21) Appl. No.: 12/517,556

(22) PCT Filed: Oct. 24, 2007

(86) PCT No.: PCT/KR2007/005261
§ 371 (c)(1),
(2), (4) Date: Jun. 3, 2009

(87) PCT Pub. No.: WO2008/069443
PCT Pub. Date: Jun. 12, 2008

(65) Prior Publication Data
US 2009/0274127 A1  Nov. 5, 2009

(30) Foreign Application Priority Data

Dec. 4, 2006 (KR) .................. 10-2006-0121645
Aug. 14, 2007 (KR) .................. 10-2007-0081765

(51) Int. Cl.
*H04J 3/00* (2006.01)
(52) U.S. Cl. .................. 370/336; 370/408; 370/470
(58) Field of Classification Search .................. 370/336, 370/345, 395.4, 470, 408
See application file for complete search history.

(56) References Cited

U.S. PATENT DOCUMENTS

| 2005/0169292 | A1* | 8/2005 | Young ................... 370/432 |
| 2005/0265306 | A1* | 12/2005 | Schrum et al. ............ 370/350 |
| 2006/0007907 | A1* | 1/2006 | Shao et al. .............. 370/347 |
| 2006/0040701 | A1* | 2/2006 | Long et al. .............. 455/525 |
| 2006/0109833 | A1* | 5/2006 | Uh et al. ................ 370/346 |
| 2006/0174030 | A1 | 8/2006 | Choi et al. |

FOREIGN PATENT DOCUMENTS

| KR | 1020040047425 A | 6/2004 |
| KR | 1020060008217 A | 1/2006 |
| KR | 1020060031477 A | 4/2006 |
| KR | 1020060035443 A | 4/2006 |
| KR | 1020060122908 A | 11/2006 |
| KR | 10-0728911 | 6/2007 |

OTHER PUBLICATIONS

International Search Report for PCT/KR2007/005261 filed on Oct. 24, 2007.
Written opinion of the International Searching Authority for PCT/KR2007/005261 filed on Oct. 24, 2007.

* cited by examiner

*Primary Examiner* — Brian D Nguyen

(57) ABSTRACT

Provided is a method for determining superframe to efficiently perform beacon scheduling by allocating superframe lengths which are different according to a routing depth of sensor nodes in a ZigBee based wireless sensor network. The method for determining a superframe for beacon scheduling, includes the steps of: receiving a beacon from a neighboring node and grasping information on a superframe used by the neighboring nodes; and determining a transmission time and a length of own superframe based on superframe information of the grasped neighboring node.

6 Claims, 8 Drawing Sheets

METHOD FOR DETERMINING SUPERFRAME FOR BEACON SCHEDULING

TECHNICAL FIELD

The present invention relates to a method for determining a superframe length for efficient beacon scheduling in a ZigBee based wireless sensor network; and, more particularly, to a method for determining a superframe length to efficiently perform beacon scheduling by allocating superframe lengths which are different according to a routing depth of sensor nodes in a ZigBee based wireless sensor network.

This work was supported by the IT R&D program for MIC/IITA [2005-S-038-02, "Development of UHF RF-ID and Ubiquitous Networking Technology"].

BACKGROUND ART

Accordingly to a ZigBee network topology, each node in a wireless sensor network system is divided into a ZigBee coordinator (ZC), a ZigBee Router (ZR), and a ZigBee end device (ZB).

The ZigBee coordinator manages an entire tree as a device located at the highest level of a tree structure and manages an entire tree. The ZigBee router is located as a low-level node of the ZigBee coordinator or a low-level node of another router, and communicate by performing synchronization based on a beacon transmitted from the ZigBee coordinator and a high-level router. The ZigBee router may have a low-level node.

As a device which is located at the lowest level on the network topology, the ZigBee end device has a sensor, senses an environment through a sensor, synchronizes the sensed data based on the beacon transmitted from the ZigBee router and the ZigBee coordinator, and transmits the data.

Generally, in a network adopting a ZigBee standard of a tree structure, data sensed and reported by a network ZigBee end device is concentrated in the ZigBee coordinator of the network or routers of small routing depth.

That is, the data sensed and transmitted by the ZigBee end device are not transmitted to routers of large routing depth a lot but are concentrated in the routers of small routing depth, which are located at a high-level of the tree structure.

It will be described in de-tail with reference to FIG. 1 hereinafter.

FIG. 1 is a diagram showing a tree routing method in a beacon mode adopting a conventional ZigBee standard and shows a routing method in a tree structure where a routing parameter is that Lm(Routing Depth)=5, Rm(Max Number of Router)=5, and Cm(Max Number of Child)=7.

Referring to FIG. 1, a router having 4 routing depth (Lm) and '1097' address receives data from 3 devices having '1098', '1099', and '1100' addresses and transmits the received data to a router having '1096' address.

A router having 4 Lm and '1105' address receives data from 4 devices having '1106', '1107', '1108', and '1109' addresses and transmits the received data to the router having '1096' address.

Meanwhile, since a router having 3 Lm and '1096' address receives data from own child routers having '1097' and '1105' addresses and transmits the data to a parent router having '1095' address, the router should transmit/receive the larger number of data than the child routers having '1097' and '1105' addresses.

In consideration of data transmission/reception according to the routing depth (Lm), the network ZigBee coordinator should transmit/receive the larger number of data than the router which is located in a network end.

FIG. 2 shows a superframe allocated in a beacon mode adopting a conventional ZigBee standard.

Referring to FIG. 2, all ZigBee coordinators and ZigBee routers on the same network based on ZigBee have the same superframe length which is expressed as a Superframe Order (SO) value with no regard to the routing depth.

When the routing depth (Lm) value of the routing parameter is small, when the number of devices installed on the network is small, or when the data are not generated by an event in the devices, there is no problem in operation. However, when the routing depth (Lm) value of the routing parameter is large or when the sensor network has the large number of devices installed on the network, data are concentrated in the ZigBee coordinator or routers having small routing depth. Accordingly, the data are not normally transmitted, thereby causing problems such as losing of data or exceeding of data transmission time.

The superframe length is extended in order to solve the above problem as shown in FIG. 3.

FIG. 3 is a diagram showing a superframe whose length is extended in a beacon mode adopting a conventional ZigBee standard and shows a superframe allocated to transmit/receive the large number of data.

Referring to FIG. 3, when the superframe length of all ZigBee coordinators and ZigBee routers on the network is identically extended, the ZigBee coordinator and the routers having small routing depth can safely operate.

However, when all ZigBee coordinators and ZigBee routers have a large superframe order value for the ZigBee coordinator and the ZigBee routers having small routing depth, routers which do not require the large number of data communication, i.e., routers having a large routing depth, have the same superframe order value and a problem that frequency resources are wasted is generated.

Also, when all ZigBee coordinators and ZigBee routers have a large superframe order value, there is a problem that the number of routers which can be accepted in the same beacon interval is limited. That is, since a beacon order value for determining the beacon interval is the same, there is a problem that only a comparatively small number of routers can access to the network.

DISCLOSURE

Technical Problem

An embodiment of the present invention is directed to providing a method for determining a superframe to efficiently perform beacon scheduling by allocating superframe lengths which are different according to a routing depth of sensor nodes in a wireless sensor network.

The objects of the present invention are not limited to the above-mentioned ones. However, other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for determining a superframe for beacon scheduling, including the steps of: receiving a beacon from a neighboring node and grasping information on a superframe used by the neighboring nodes; and determining a transmission time and a length of own superframe based on superframe information of the grasped neighboring node.

The method of the present invention, further includes the steps of: checking whether there is another node to access to the node, which is called a child node; and when there is the child node, transmitting the determined own superframe information and superframe information of own parent node, which is a high-level node to be accessed by own node, to the child node.

Advantageous Effects

As described above, the present invention can efficiently use frequency resources by allocating superframe lengths which are different according to a routing depth.

Also, the present invention helps smooth network access of routers and minimize data loss and a data transmission time by allocating a superframe of a long length to routers having a small routing depth.

BEST MODE FOR THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
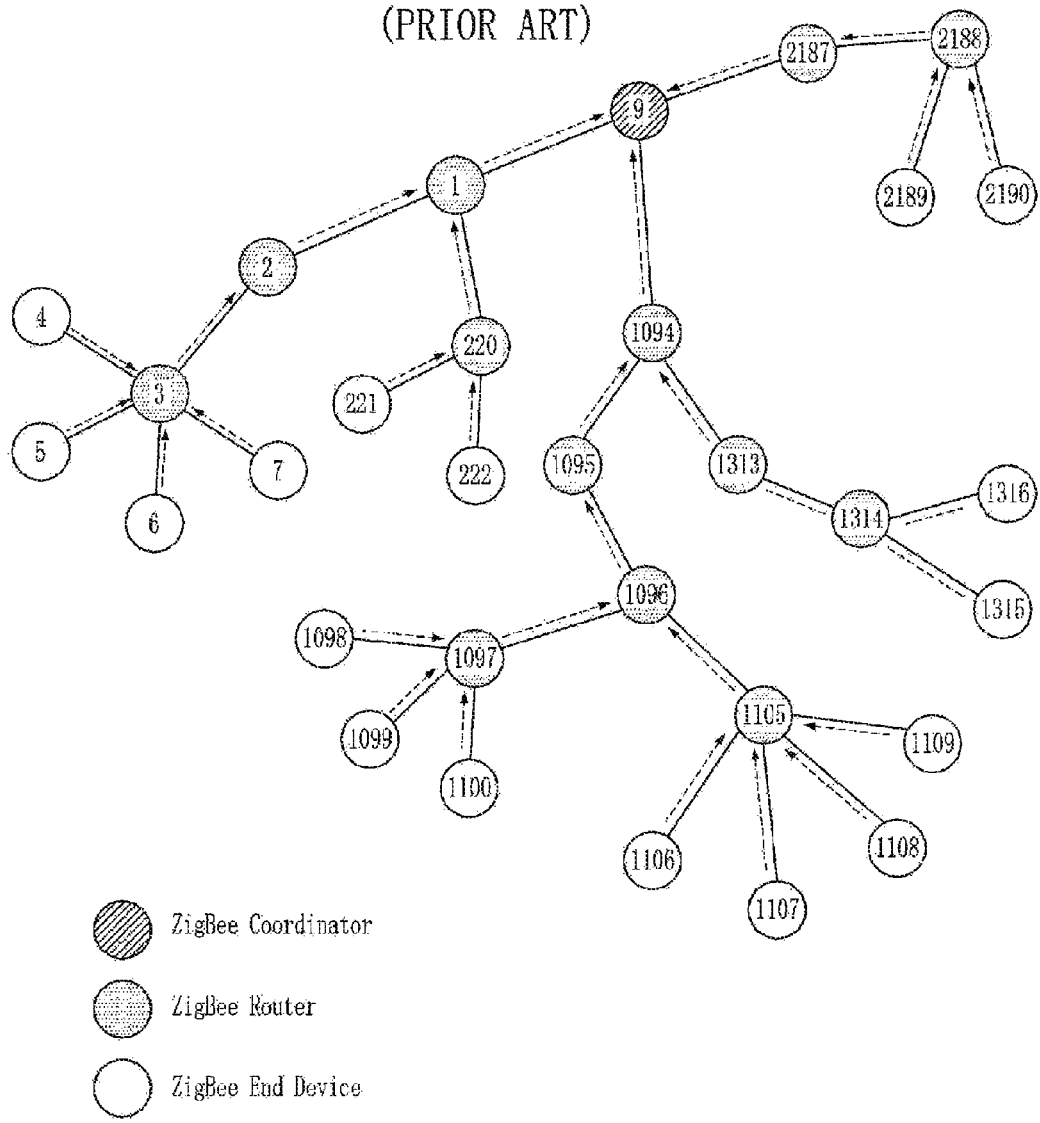
FIG. 1 is a diagram showing a tree routing method in a beacon mode adopting a conventional ZigBee standard.
Figure 2:
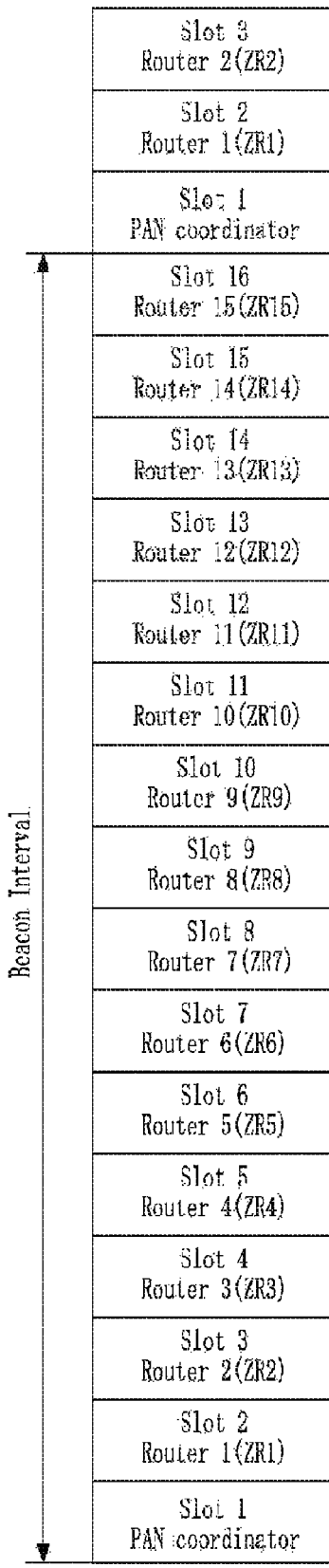
FIG. 2 shows a superframe allocated in the beacon mode adopting the conventional ZigBee standard.
Figure 3:
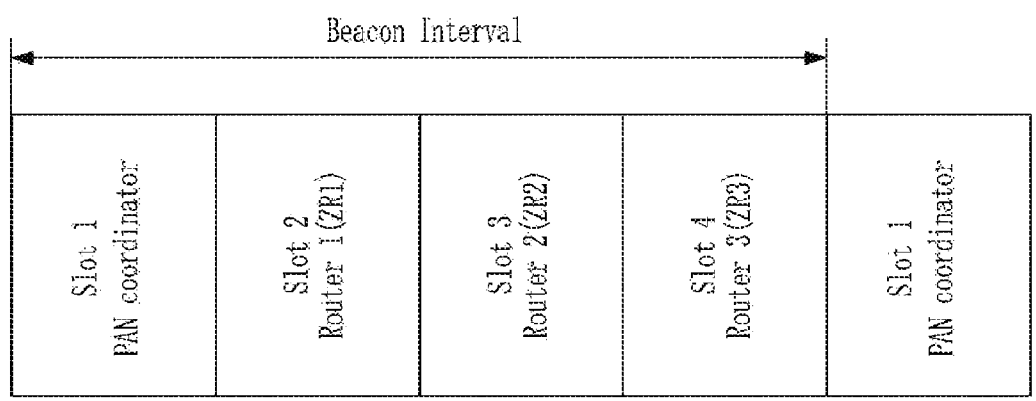
FIG. 3 is a diagram showing a superframe whose length is extended in the beacon mode adopting the conventional ZigBee standard.
Figure 4:
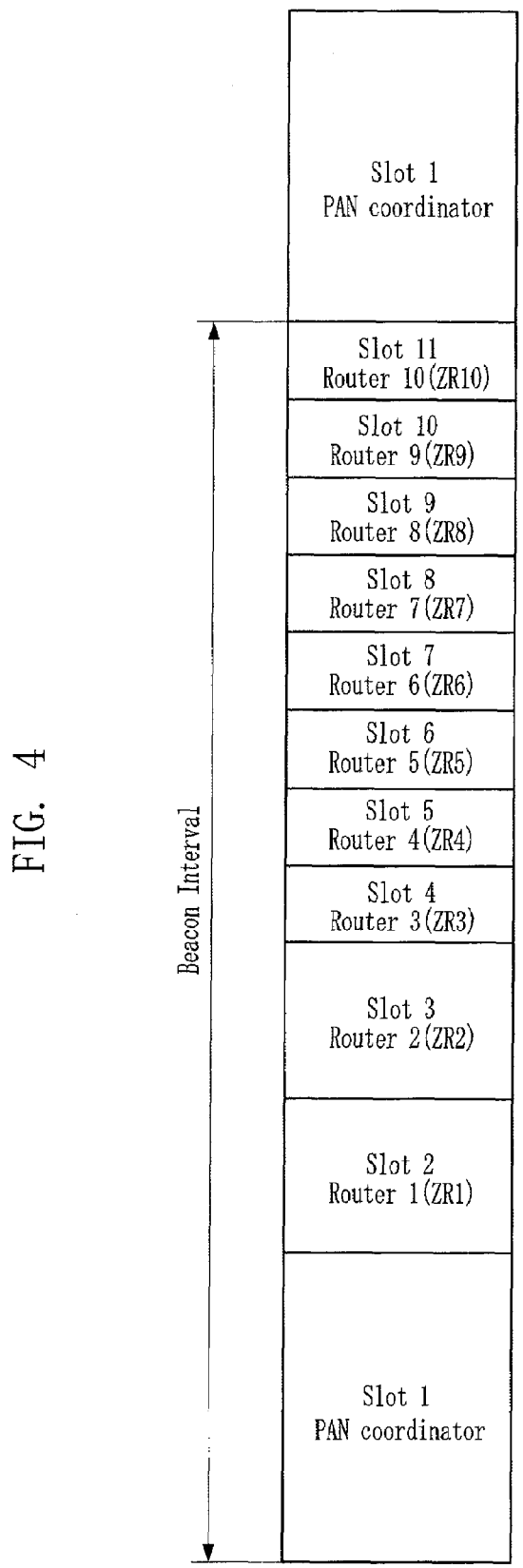
FIG. 4 is a diagram showing a superframe allocated differently according to a routing depth in accordance with an embodiment of the present invention.

FIG. 4 is a diagram showing a superframe allocated differently according to a routing depth in accordance with an embodiment of the present invention.

Referring to FIG. 4, when the superframe length is differently allocated according to a routing depth, the superframe length of ZigBee coordinator and the ZigBee routers having small depth which should transmit/receive the larger number of data than the routers having a large depth in a network end becomes longer, and the superframe length of the routers having a large depth. Accordingly, the network can be stably and smoothly operated.

Figure 5:
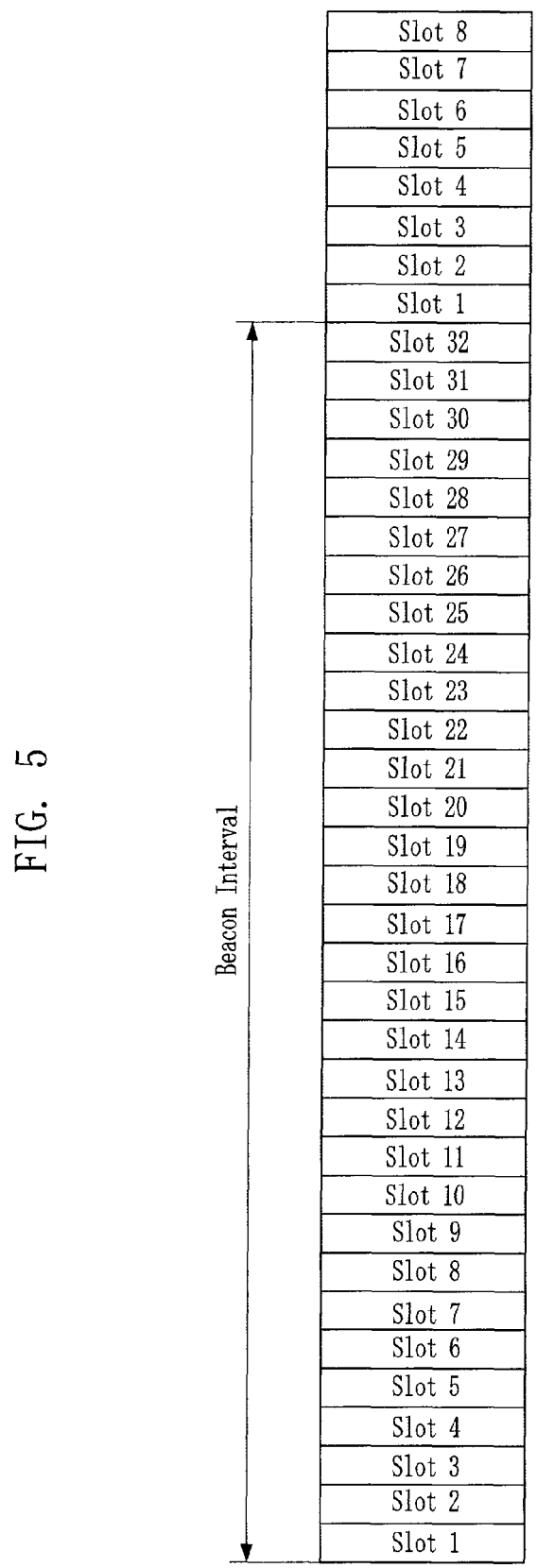
FIG. 5 shows a beacon interval which is divided into basic superframe slots in accordance with an embodiment of the present invention.

FIG. 5 shows a beacon interval which is divided into basic superframe slots in accordance with an embodiment of the present invention.

The basic superframe slot has a '0' superframe order value.

In a ZigBee standard, the length of all superframes is determined by a superframe order value. Referring to FIG. 5, when a beacon interval is divided into basic superframe slots having a '0' superframe order value, it is possible to grasp the superframe length and location of each router using only information on a basic superframe slot where each superframe starts and the superframe order value with no regard to the superframe length of the routers.

Figure 6:
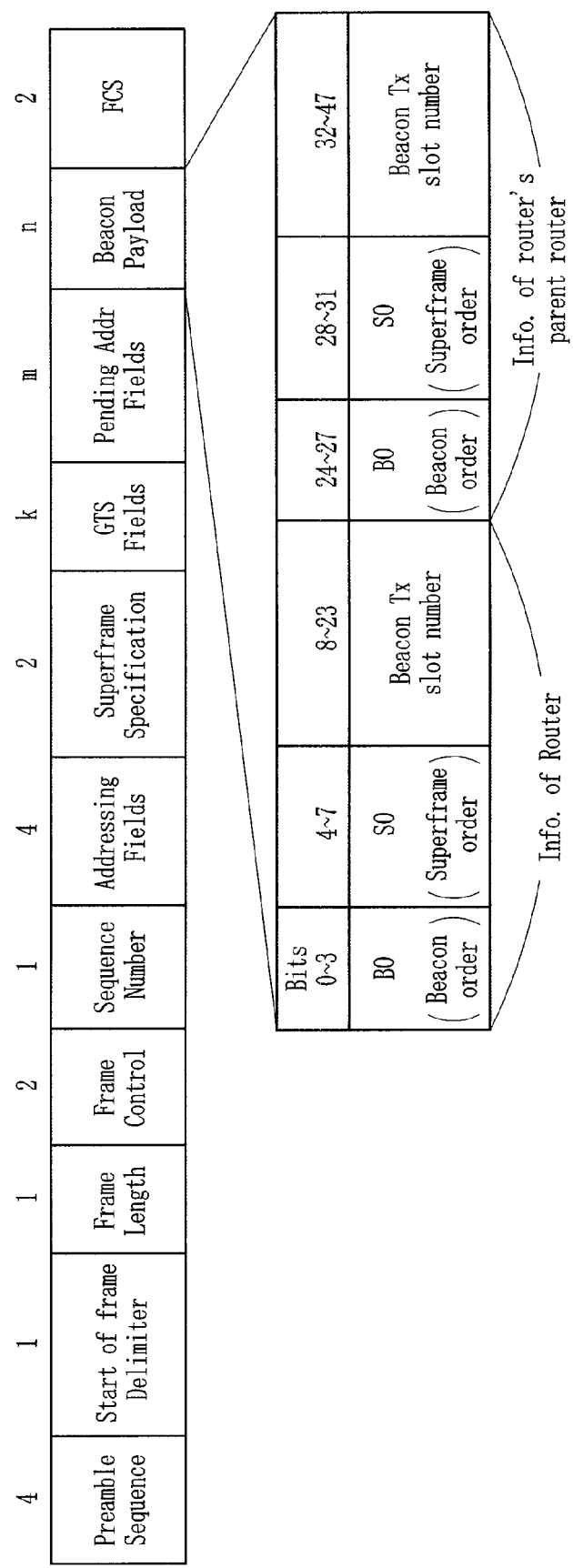
FIG. 6 shows a beacon payload in accordance with an embodiment of the present invention.

FIG. 6 shows a beacon in accordance with an embodiment of the present invention.

Referring to FIG. 6, the beacon in accordance with the present invention includes a preamble sequence, start of frame delimiter, a frame length, a frame control, a sequence number, addressing fields, superframe specification, a granted time slot (GTS) field, pending address fields, a beacon payload and a frame check sequence (FCS).

A beacon payload of the beacon includes a beacon order (BO) (smaller than 4 bit) for determining a beacon interval, a superframe order (SO) (smaller than 4 bit) for showing a superframe length, and a beacon transmission (Tx) slot number (smaller than 16 bit) for showing a transmission time of the superframe. The beacon payload shows information on the superframe of the beacon payload and own parent routers.

The ZigBee coordinator and routers transmit the beacon to neighboring routers or devices such that the neighboring routers or devices, i.e., child routers or child devices, can acquire information on the superframe of the neighboring node such as the ZigBee coordinators or routers, i.e., parent routers, and the ZigBee coordinators or routers transmitting the beacon to the neighboring routers or devices.

The routers newly accessing to the network receive the beacon from the neighboring node such as the ZigBee coordinator or routers around the newly accessing routers, checks the superframe transmission time and the superframe length of the neighboring node, and check whether there is a superframe interval that the newly accessing routers can use.

Also, the routers newly accessing to the network check signal strength of the beacon and accessibility and determines the ZigBee coordinator or the neighboring routers, i.e., parent routers.

Also, the routers newly accessing to the network determine own superframe length by checking a superframe length of the ZigBee coordinator or the neighboring routers, i.e., the parent routers, to be accessed through the received beacon information. The determined length should be smaller than or the same as the superframe length of the ZigBee coordinator or the neighboring routers, i.e., the parent routers, to be accessed.

When the superframe length of the ZigBee coordinator or the neighboring routers, i.e., the parent routers, to be accessed by the routers newly accessing to the network is larger than the basic superframe slot of FIG. 5, i.e., when a value of a superframe order is not 0, the routers newly accessing to the network determine own superframe length at a half of the parent superframe length. When the superframe length of the ZigBee coordinator or the routers, i.e., the parent routers, to be accessed by the routers is the same as the length of the basic superframe slot of FIG. 5, own superframe interval is determined at the size of the basic superframe slot.

Figure 7:
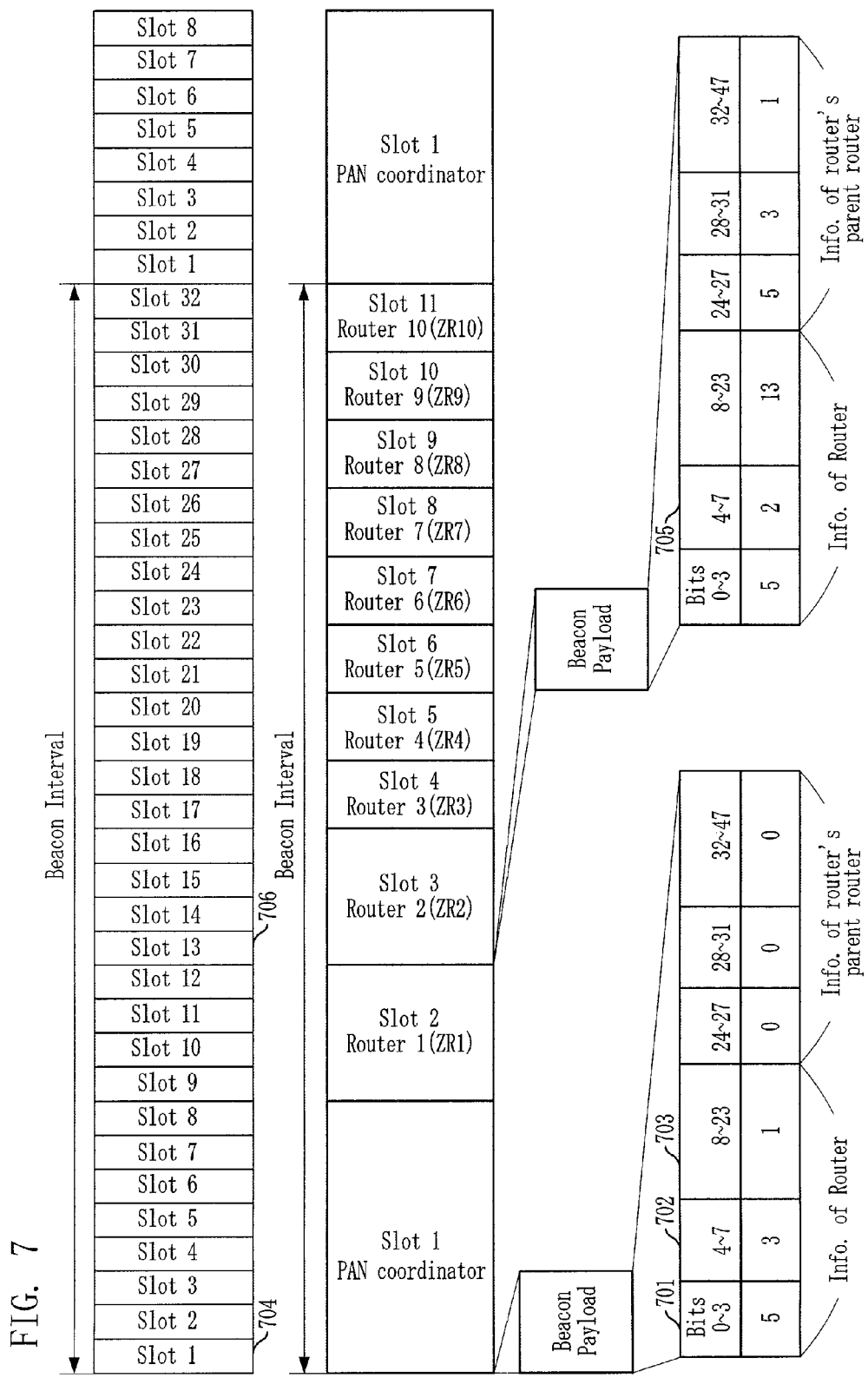
FIG. 7 shows a superframe length determining method in accordance with an embodiment of the present invention.

FIG. 7 shows a superframe length determining method in accordance with an embodiment of the present invention. Referring to FIG. 7, a Personal Area Network (PAN) coordinator transmits information on own superframe such as a beacon interval '5' (701), a superframe length '3' (702), a beacon transmission slot number '1' (703) to a ZigBee router 2 (ZR2) through the beacon.

Since the PAN coordinator transmits the information on own superframe at the basic superframe slot '1' (704) of the beacon interval, a beacon transmission slot number of the PAN coordinator becomes '1'.

The ZigBee router 2 determines own superframe length (705) based on the information received from the PAN coordinator.

The ZigBee router 2 determines own superframe length as '2' (702) which is smaller than the superframe length '3' (702) of the PAN coordinator.

Since the ZigBee router 2 transmits the beacon at the basic superframe slot '13' (706) of the beacon interval, the beacon transmission slot number of the ZigBee router 2 becomes '13'.

Figure 8:
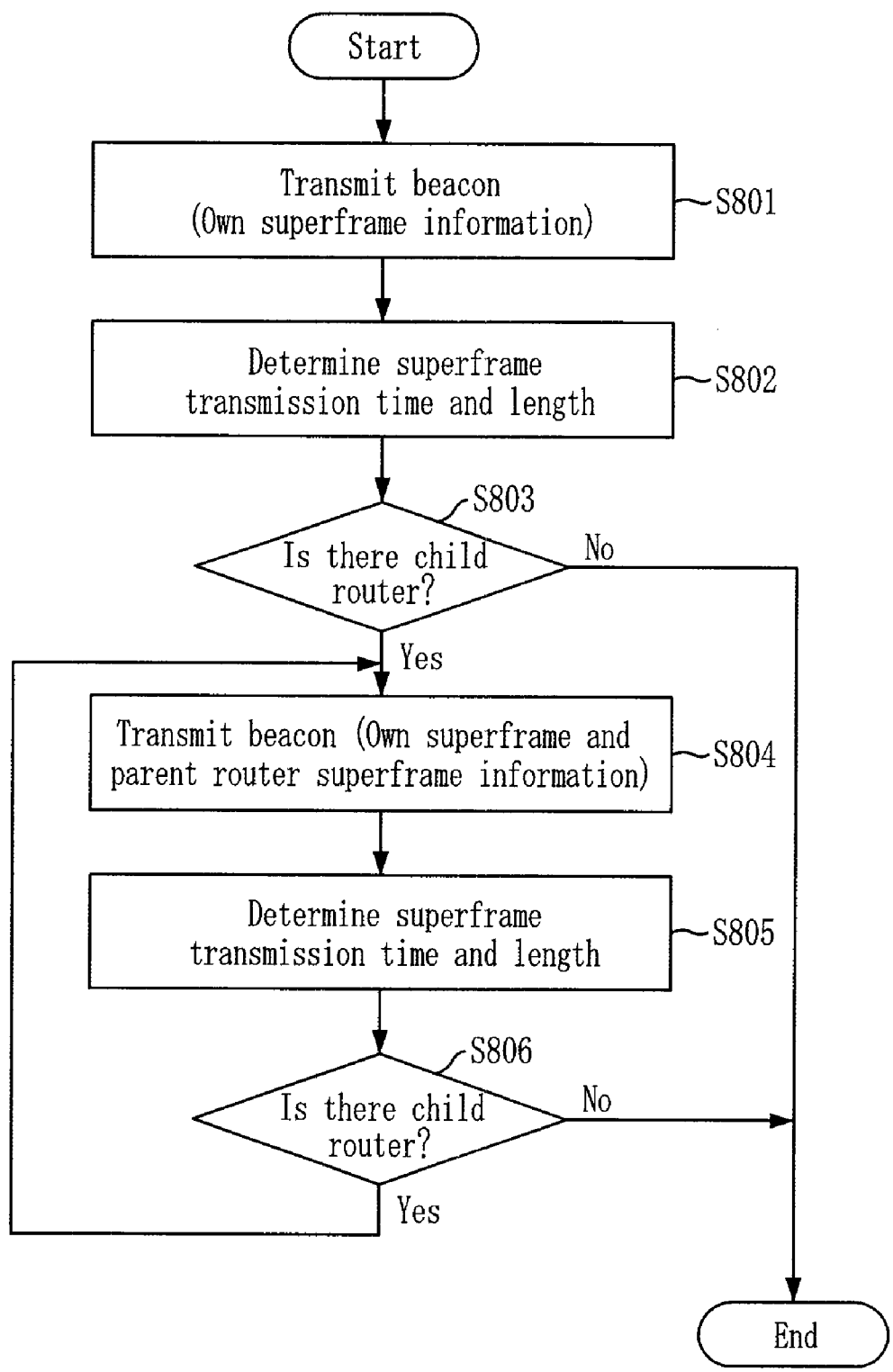
FIG. 8 is a flowchart describing a method for determining a superframe for beacon scheduling in a ZigBee based wireless sensor network in accordance with an embodiment of the present invention.

FIG. 8 is a flowchart describing a method for determining a superframe for beacon scheduling in the ZigBee based wireless sensor network in accordance with an embodiment of the present invention.

In order to grasp a superframe length and a location of each router, one beacon interval is divided into basic superframe slots having a superframe order value '0'.

The ZigBee coordinator transmits a beacon including information on own superframe to a neighboring router, which is called a first router, at step S801.

When there is a router to access to the ZigBee coordinator, which is called a second router, the ZigBee coordinator transmits the beacon including information on own superframe to the second router.

A beacon payload of the beacon shows information on own superframe including a beacon order of smaller than 4 bit for determining a beacon interval, a superframe order of smaller than 4 bit showing a superframe length, and a beacon transmission slot number of smaller than 16 bit (see FIG. 6).

The first and second routers determine a transmission time and a length of own superframe based on the information on the superframe of the parent router, i.e., the ZigBee coordinator, received from own parent router, i.e., the ZigBee coordinator at step S802.

The first and second routers can grasp the superframe length and location of own parent router, i.e., the ZigBee coordinator, based on the beacon interval which is divided into the basic superframe slots (see FIG. 5).

The first and second routers have own superframe length be smaller than the superframe interval of own parent router, i.e., the ZigBee coordinator.

The first and second routers checks at step S803 whether there is a child router to access to the first and second routers.

At a check result of the step S803, when there is no child router to access to the first and second routers, the first and second routers end determining of own superframe length. When there is the child router to access to the first and second routers, the first and second routers transmit the information on the superframe of own parent router, i.e., the ZigBee coordinator, and the information on own superframe through the beacon to a child router to access to the first and second routers, which is called a third router, at step S804.

A beacon payload of the beacon shows information on own superframe of the first and second routers and the parent router, i.e., the ZigBee coordinator, including a beacon order of smaller than 4 bit for determining a beacon interval, a superframe order smaller than 4 bit showing a superframe length, and a beacon transmission slot number of smaller than 16 bit (see FIG. 6).

The third router determines the transmission time and length of own superframe based on information on the superframe of own parent routers, i.e., the ZigBee coordinator and the first or second router, received from own parent routers, i.e., the first or second router, at step S805.

The third router can grasp a length and a location of the superframe of own parent routers, i.e., the ZigBee coordinator and the first or second router, based on the beacon interval which is divided into basic superframe slots.

The third router has own superframe length be smaller than the superframe interval of own parent routers, i.e., the ZigBee coordinator and the first or second router.

The third router checks at step S806 whether there is a child router to access to the third router.

At a check result of the step S806, when there is no child router to access to the third router, the third router ends determining own superframe length. When there is a router to access to the third router, which is called a fourth router, the third router transmits information on the superframe of own parent router, i.e., the first or second router, and information on own superframe to the fourth router through the beacon at step S804.

A beacon payload of the beacon shows information on own superframe of the third router and the parent router of the third router, i.e., the first or second router, including a beacon order of smaller than 4 bit for determining a beacon interval, a superframe order of smaller than 4 bit showing a superframe length, and a beacon transmission slot number of smaller than 16 bit (see FIG. 6).

According to the above-mentioned method, the routers receive a beacon of another router to be accessed by the router, i.e., own parent router, checks information on the superframe of own parent router and the parent router of own parent router from the received beacon information, and determines information on own superframe based on the checked information.

Also, when there is own child router, i.e., another router to access to the router, the routers transmit information on the determined own superframe and information on the superframe of own parent router to own child router, i.e., another router to access to the router.

As described above, the technology of the present invention can be realized as a program. A code and a code segment forming the program can be easily inferred from a computer programmer of the related field. Also, the realized program is stored in a computer-readable recording medium, i.e., information storing media, and is read and operated by the computer, thereby realizing the method of the present invention. The recording medium includes all types of recording media which can be read by the computer.

The present application contains subject matter related to Korean Patent Application Nos. 2006-0121645 and 2007-0081765, filed in the Korean Intellectual Property Office on Dec. 4, 2006 and Aug. 14, 2007, the entire contents of which are incorporated herein by reference.

While the present invention has been described with respect to certain preferred embodiments, it will be apparent to those skilled in the art that various changes and modifications may be made without departing from the scope of the invention as defined in the following claims.

INDUSTRIAL APPLICABILITY

The present invention can be used in a wireless sensor network operating as a beacon mode adopting a ZigBee standard. That is, the present invention can be used to beacon scheduling in a wireless network including one ZigBee coordinator for transmitting a beacon according to a period, at least two routers, and a plurality of ZigBee end devices having a sensor for collecting data.

What is claimed is:

1. A method for determining a superframe for beacon scheduling, comprising the steps of:
   receiving, by a node, a beacon from a neighboring node and grasping, from the beacon, information on a superframe used by the neighboring node; and
   determining superframe information of the node, including a transmission time and a length of a superframe of the node, based on the grasped information on the superframe of the neighboring node.

2. The method of claim 1, further comprising the steps of:
   checking whether there is another node to access to the node, which is called a child node; and
   when there is the child node, transmitting the determined superframe information of the node and superframe information of a parent node of the node, which is a high-level node to be accessed by the node, to the child node.

3. The method of claim 2, wherein in the step of determining the superframe information of the node, the length of the superframe of the node should not be larger than a superframe interval of the parent node.

4. The method of claim 1, wherein the superframe information includes beacon interval information, superframe length information, and transmission time information of the superframe.

5. The method of claim 4, wherein the beacon has a structure that the beacon interval is divided into a plurality of basic superframe slots.

6. The method of claim 5, wherein the basic superframe slot is a slot whose superframe length is '0'.

* * * * *